(12) United States Patent
Stone et al.

(10) Patent No.: US 7,103,234 B2
(45) Date of Patent: *Sep. 5, 2006

(54) METHOD FOR BLIND CROSS-SPECTRAL IMAGE REGISTRATION

(75) Inventors: Harold S. Stone, Princeton, NJ (US); Robert Wolpov, Big Bear City, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 822 days.

This patent is subject to a terminal disclaimer.

(21) Appl. No.: 09/822,586

(22) Filed: Mar. 30, 2001

(65) Prior Publication Data

US 2002/0176638 A1  Nov. 28, 2002

(51) Int. Cl.
G06K 9/32 (2006.01)
G06K 9/64 (2006.01)
G06K 9/36 (2006.01)
G06K 9/40 (2006.01)

(52) U.S. Cl. ...................... 382/294; 382/278; 382/280; 382/266

(58) Field of Classification Search ........ 382/168–170, 382/103, 130, 151, 148, 278, 284, 293–296, 382/299, 263, 264, 266, 280
See application file for complete search history.

(56) References Cited

U.S. PATENT DOCUMENTS

| | | | | | |
|---|---|---|---|---|---|
| 4,972,359 | A | * | 11/1990 | Silver et al. | 708/424 |
| 5,295,200 | A | * | 3/1994 | Boyer | 382/280 |
| 5,325,200 | A | * | 6/1994 | Jaffray et al. | 348/586 |
| 5,600,734 | A | * | 2/1997 | Okubo et al. | 382/147 |
| 5,982,915 | A | * | 11/1999 | Doi et al. | 382/130 |
| 6,075,905 | A | * | 6/2000 | Herman et al. | 382/284 |
| 6,266,452 | B1 | * | 7/2001 | McGuire | 382/294 |
| 6,378,572 | B1 | * | 4/2002 | Neubauer et al. | 141/94 |
| 6,591,196 | B1 | * | 7/2003 | Yakhini et al. | 702/28 |

OTHER PUBLICATIONS

Townshend, J.R.G., et al., "The Impact of Misregistration on Change Detection", IEEE Trans. On Geoscience and Remote Sensing, vol. 30, No. 5, pp. 1054-1060, Sep. 1992.

Dai, X., et al., "Automated image registration for change detection From Landsat Thematic Mapper imagery", in 1996 IGARSS, Remote Sensing—Remote Sensing for a Sustainable Future, May 1996, vol. 3, pp. 1348-1350.

Dai, X, et al., "Development of a Feature-based Approach to Auotmated Image Registration for Multitemporal and Multisensor Remotely Sensed Imagery", in 1997 IGARSS, Remote Sensing—A Scientific Vision for Sustainable Development, Aug. 1997, vol. 1, pp. 243-245.

Dai, X., et al., "A Feature-Based Registration Algorithm Using Improved Chain-Code Representation Combined with Invariant Moments" IEEE Transactions of Geoscience and Remote Sensing, vol. 37, No. 5, pp. 2351-2362, Sep. 1999.

(Continued)

*Primary Examiner*—Bhavesh M. Mehta
*Assistant Examiner*—Wes Tucker

(57) ABSTRACT

A method for registration of first and second images out of registration. The method includes the steps of: (a) making the edges in the first and second images more prominent; (b) thresholding the first and second images from the previous step using a threshold for which N percent of the pixels of each of the first and second images are over the threshold; (c) reducing the resolution of the first and second images from the previous step; and (d) registering the first and second images of reduced resolution from the previous step.

25 Claims, 16 Drawing Sheets

OTHER PUBLICATIONS

Flusser, J., et al., "A Moment-Based Approach to Registration of Images with Affine Geometric Distortion", IEEE Transactions on Geoscience and Remote Sensing, vol. 32, No. 2, pp. 382-387, Mar. 1994.

Govindu, V., et al., "Using Geometric Properties for Correspondence-less Image Alignment", in Proc. of 14th International Conference on Pattern Recognition, vol. 1, pp. 37-41, Aug. 1998.

Govindu, V., et al., "Alignment Using Distributions on Local Geometric Properties", IEEE Trans. On Pattern Analysis and Machine Intelligence, vol. 21, No 10, pp. 1031-1043, Oct. 1999.

Hsu, L.-Y, et al., Automated Registration of Brain Images Using Edge and Surface Features, IEEE Engineering in Medicine and Biology, vol. 18, No. 6, pp. 40-47, 1990.

Kumar, R., et all., Frameless Registration of MR and CT 3D Volumetric Data Sets, in Proceedings of the Second IEEE Workshop on Applications of Computer Vision, pp. 240-248, Dec. 1994.

Li, H., et al., "A Contour-Based Approach to Multisensor Image Registration", IEEE Trans. On Image Processing, vol. 4, No. 3, pp. 320-334, 1995.

Moshfeghi, M., "Multimodality Image Registration Techniques in Medicine", in Proceedings of 11th IEEE Conference on Engineering in Medicine and Biology, Y. Kim and F.A. Spelman, Eds., vol. 6, pp. 2007-2008, Nov. 1989.

Ton, J., et al., "Registering Landsat Images by Point Matchng", IEEE Transactions on Geoscience and Remote Sensing, vol. 27, No. 5, pp. 642-651, Sep. 1989.

Viola, P., et al., "Alignment by Maximization of Mutual Information", in Proc. of 5th International Conference on Computer Vision, pp. 16-23, Jun. 1995.

Maes, F., et al., "Multimodality Image Registration by Maximization of Mutual Information", IEEE Transaction on Geoscience and Remote Sensing, vol. 38, No. 3, pp. 1476-1478, May 2000.

Thevanaz, P., et al., A Pyramid Approach to Subpixel Registration Based on Intensity, IEEE Transactions on Image Processing, vol. 7, pp. 27-41, Jan. 1998.

Thevanaz, P., et al., "A Pyramid Approach to Sub-Pixel Image Fusion Based on Mutual Information", in Proc. of 1996 IEEE International Conference on Image Processing, vol. 1, pp. 265-268, Sep. 1996.

Stone, H.S., "Progressive Wavelet Correlation Using Fourier Methods", IEEE Transactions on Signal Processing, vol. 47, pp. 97-107, Jan. 1999.

Chandra, D.V.S., "Fast Registration of Multispectral Images Using Orthogonal Transforms", in Proc. of 35th Midwest Symposium on Circuits and Systems, vol. 1, pp. 703-706, Aug. 1992.

Irani, M., et al., "Robust Multi-Sensor Images Alignment", in Proc. of the 1998 International Conference on Computer Vision, pp. 959-966, Jan. 1998.

Simoncelli, E.P., et al., "Shiftable Multiscale Transforms", IEEE Transactions on Information Theory, vol. 38, No. 2, pp. 587-607, Mar. 1992.

Blahut, R.E., "Fast Algorithms for Digital Signal Processing", Addison-Wesley, pp. 66-69 and 240-246, 1985.

Canny, J, "A Computational Approach to Edge Detection", IEEE Transactions on Pattern Analysis and Machine Intelligence, vol. 8, pp. 679-698, 1986.

Chen, H.-M, et al., "A Pyramid Approach for Multimodality Image Registration Based on Mutual Information", in Proc. of the Third International Conference on Information Fusion, vol. 1, pp. MoD3 9-15, Jul. 2000.

* cited by examiner

METHOD FOR BLIND CROSS-SPECTRAL IMAGE REGISTRATION

BACKGROUND OF THE INVENTION

1. Field of the Invention

The present invention relates generally to registration of images and, more particularly, to a method for blind cross-spectral image registration.

2. Prior Art

Image registration is the process of aligning two images of the same scene so that corresponding points in the scene are placed in identical pixel positions. Standard full-color reproductions use precisely registered images for each of the component colors. Similarly, false color images combine registered image planes from various spectra to reveal important details not readily apparent in the individual images. For remote sensing, registration of infrared to visible spectra is especially important for measuring vegetation, detecting ocean currents, and tracking hot spots in forest fires. Registration of images taken at different times is typically used to identify changes between the images.

The prior art for the problem of image registration generally falls into two different approaches—feature-based and blind. Feature-based registration attempts to identify edges, corner points, contours, or other features that are common to two images, and then uses standard geometric transforms to compute the mapping between the pairs. The problem of identifying those features is complicated by the fact that edge features in infrared images are related to temperature variations, and these edges may not be present in the visible spectrum. Likewise, some features in the visible spectrum may disappear in the infrared spectrum. Consequently, feature-based registration is mainly concerned with locating features common to both images, and rejecting features that are exclusive to one image. The problem becomes difficult when relatively few features are common between the images. For example, a pair of aerial images of an agricultural region may show relatively uniform intensity in the visible spectrum, and highly textured intensity in the infrared spectrum. Each feature evident in the visible spectrum may map to many possible candidates in the infrared image.

The second approach to the problem is to register images blindly by maximizing some criterion that depends on the quality of a candidate registration. The second approach completely avoids the problem of finding a subset of features common to both images, and matching the features to each other. Typical criteria for blind registration are to minimize the sum of squared differences of pixel values or to maximize the normalized correlations of the images. Perhaps the most powerful criterion is the maximization of mutual information which is particularly effective when one image differs from the other in a rather complex way, such as might be observed due to changes in the illumination source position, image modality (X-ray and MRI), or spectral channel (visible and infrared). It has been used effectively in practice to register PET, MR, and CT medical images.

A major potential disadvantage of mutual-information-based methods is the large computational overhead required to compute the joint distributions between two images for many different relative alignments of the images. To overcome this disadvantage, those in the art describe nonlinear iterative methods that reduces substantially the number of different relative alignments that need to be examined. Although the non-linear iterative methods use a sum of square differences of pixel values as the criterion for registration quality, it is known to use mutual-information criterion in its place.

Although the non-linear iterative methods, like all blind-registration algorithms, avoid the cost of identifying corresponding features, the computation is expensive, even in the iterative form of the method. For each relative position of the images considered, a joint distribution of pixel values needs to be computed, which involves a number of operations proportional to the size of the image. Coarse-to-fine techniques known in the art help reduce this cost. Nevertheless, the algorithm must examine several different displacements at maximum detail and many more at lesser detail, and each examination involves access to all of the pixel values at that level of detail.

SUMMARY OF THE INVENTION

Therefore it is an object of the present invention to provide a method for registration of images with comparable quality as methods which employ maximization of mutual information but with lower computational complexity.

The registration methods of the present invention concern a fast technique for registering image pairs from visible and infrared spectra that differ by translation, small rotations, and small changes of scale. The main result of the registration methods of the present invention is a nonlinear prefiltering and thresholding technique that substantially enhances the cross-spectral correlation, provided that the image pairs have many features in common. The non-linear prefiltering and thresholding techniques provided are used in conjunction with a Fourier-based normalized correlation method to perform fast cross-spectral registrations. In the absence of such prefiltering, local reversals of contrast from image to image tend to impair the quality of correlation-based registrations.

The registration methods of the present invention are blind in that they do not identify specific features in both images to use for alignment. Instead, they compute the translation that maximizes the overall normalized correlation of the filtered images. Small rotations and scale changes can be recovered by computing the translation displacement in several different regions of the image pairs. Fourier techniques for computing normalized correlations greatly reduce computational costs, and eliminate the necessity to use iterative search techniques to hold computation costs down.

Accordingly, a method for registration of first and second images out of registration is provided. The method comprises the steps of: (a) making the edges in the first and second images more prominent; (b) thresholding the first and second images from the previous step using a threshold for which N percent of the pixels of each of the first and second images are over the threshold; (c) reducing the resolution of the first and second images from the previous step; and (d) registering the first and second images of reduced resolution from the previous step.

Preferably, the method further comprises the step of blurring the first and second images from the thresholding step. The blurring step preferably comprises filtering each of the first and second images from the thresholding step such that each pixel therein is thickened by a predetermined number of pixels in a square array that extends the predetermined number of pixels in all four directions from a central pixel. The method preferably also further comprises the step of increasing the resolution of the registered first and second images from the registering step.

Also provided are a computer program product for carrying out the methods of the present invention and a program storage device for the storage of the computer program product therein.

BRIEF DESCRIPTION OF THE DRAWINGS

These and other features, aspects, and advantages of the methods of the present invention will become better understood with regard to the following description, appended claims, and accompanying drawings where:

DETAILED DESCRIPTION OF THE PREFERRED EMBODIMENT

The registration methods of the present invention use an alternative strategy for cross-spectral image registration that takes advantage of Fourier techniques to reduce the complexity of normalized correlation. One can compute normalized correlations of two images for all relative integral displacements of the two images for a small constant times the cost of the normalized correlation at a single position. Since the cost for one normalized correlation is about the same cost as one mutual information evaluation at the same level of detail, it is clear that the Fourier-based normalized correlation method enjoys a computational advantage over the mutual-information methods of the prior art. The pixel-based normalized correlation registration methods whose timing is known in the art is much slower than its Fourier-based counterpart.

The main difficulty in using fast correlation is that cross-spectral images typically have poor correlations. An objective of the present invention is to find a way to process images so that they can be registered accurately by means of fast normalized correlation. Those in the art have discussed the general problem of registering images across spectra and commented that global measures of registration accuracy usually work poorly in such cases. Any features that are exclusive to one image or another cause problems for normalized correlation, mutual-information, and other global measures because the exclusive features degrade the similarity measures. Those in the art processed the images to enhance image similarity, and then used local correlation rather than global correlation. They used an iterative scheme similar to that of the non-linear iterative methods to find a registration that maximizes the sum of the local correlations. The registration methods of the present invention also process the images, but does so in a way that enables fast global correlation to succeed.

The main results of the registration methods of the present invention lie in the combination of an image preprocessing method and fast normalized correlation to register cross-spectral images with about the same quality as maximization of mutual information but with lower computational complexity. The preprocessing uses both edge enhancement and thresholding, with optional blurring (alternatively referred to in the art as thickening), which may be useful in conjunction with coarse-to-fine registration. For a moderate-sized data base, the registration methods of the present invention registered cross-spectral images about as well as mutual-information registration at full resolution, and was slightly inferior in quality at lower resolution.

The registration methods of the present invention are based on normalized correlation of nonlinearly filtered images. Before expanding on the same, a general overview is first given.

Figures 1A, 1B:
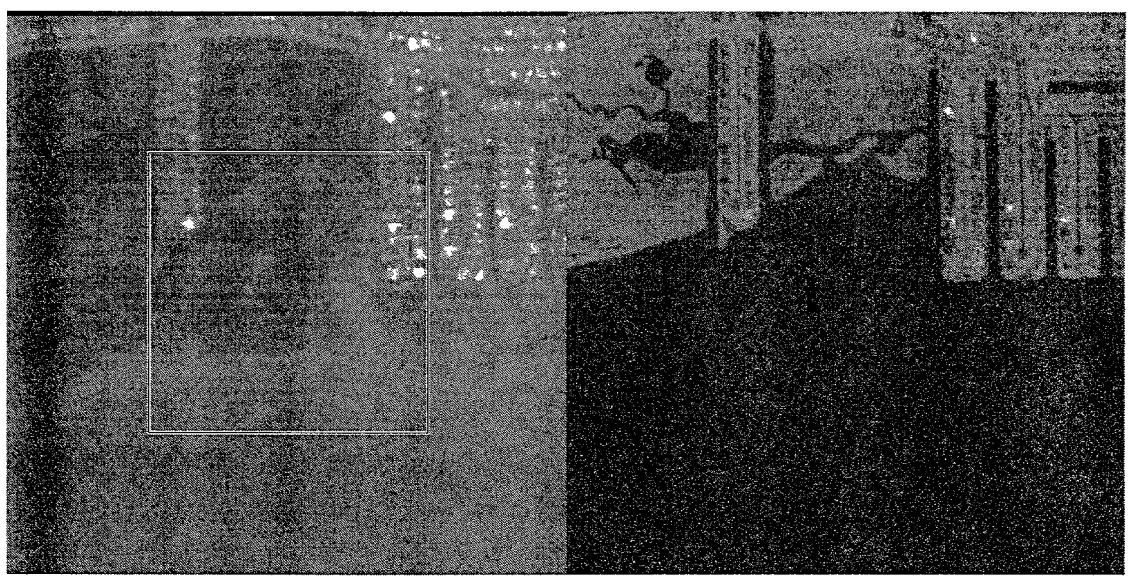
FIGS. 1a and 1b illustrate a wetlands image, with FIG. 1a illustrating the red channel intensity of the wetlands image and FIG. 1b illustrating the infrared channel intensity.

FIGS. 1a and 1b illustrate the nature of the registration problem. The two images in FIGS. 1a and 1b are aerial photos that are slightly out of registration. The image of FIG. 1a illustrates an image in the red visible spectrum, while the image of FIG. 1b is in the infrared spectrum. Note that there are some intensity inversions from image to image, but in many regions there is no intensity inversion. Registration techniques based on normalized correlation tend to perform poorly in these circumstances. Normalized correlation measures how well an affine mapping of image intensities explains the differences between the intensities of two images. Local intensity inversions tend to fall outside an affine mapping, thereby lowering correlation values.

When cross-spectral region intensities correlate poorly, it is reasonable to use region boundaries rather than intensities for registration purposes. Because of changes of intensity in different spectra, the boundaries visible in one image generally do not correspond to boundaries in the other image in a one-to-one fashion. Moreover, even where they correspond, the detected boundaries in the two images may have different pixel structure, and therefore may not register well. This tends to reduce the correlation coefficient, and makes precise registration very difficult.

Figures 2A, 2B:
FIGS. 2a and 2b illustrate the images of FIGS. 1a and 1b, respectively, after filtering to enhance edges using a filter coefficient of C=8.5.
Figures 3A, 3B:
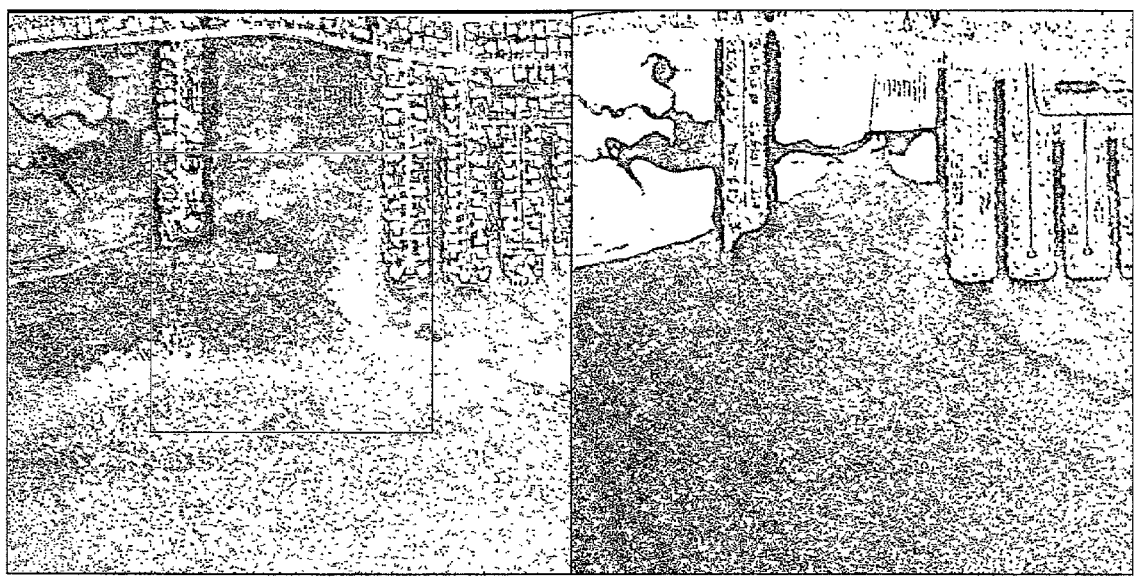
FIGS. 3a and 3b illustrate the images of FIGS. 2a and 2b, respectively, after thresholding to create 80% white pixels.
Figures 4A, 4B:
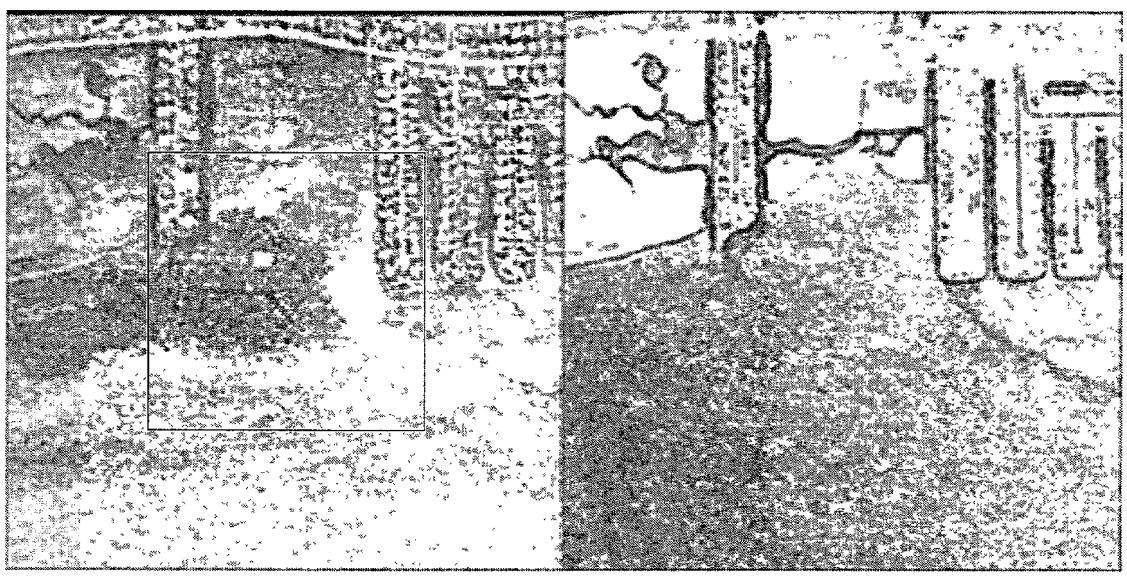
FIGS. 4a and 4b illustrate the images of FIGS. 3a and 3b, respectively, after thickening by 5.
Figures 5A, 5B:
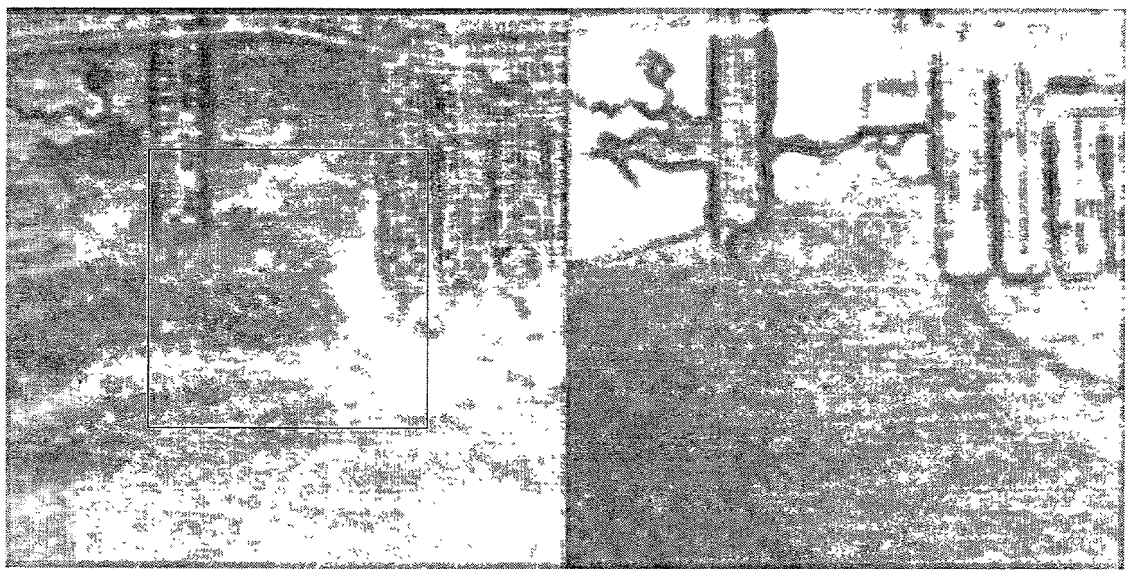
FIGS. 5a and 5b illustrate the images of FIGS. 3a and 3b, respectively, after thickening by 9.
Figures 6A, 6B:
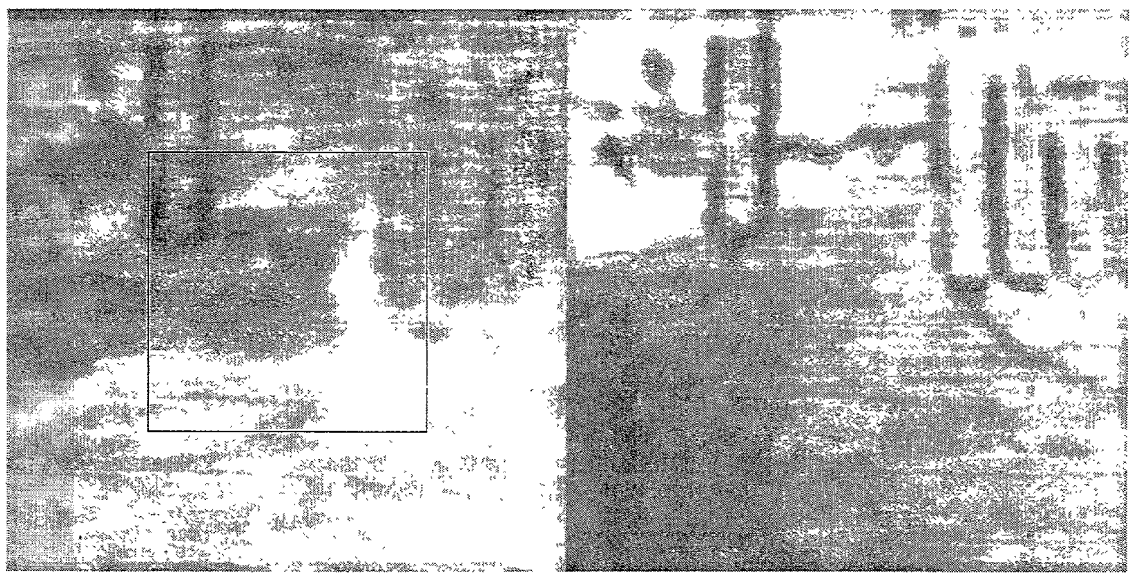
FIGS. 6a and 6b illustrate the images of FIGS. 3a and 3b, respectively, after thickening by 17.

A first step in the registration methods of the present invention is to filter the images with an edge-enhancement filter to make the edges prominent. Prefiltering is illustrated in FIGS. 2a, 2b, 3a, and 3b. FIGS. 2a and 2b show the images of FIGS. 1a and 1b, respectively, after being edge-enhanced filtered. FIGS. 3a and 3b show the images of FIGS. 2a and 2b, respectively, after thresholding. The images of FIGS. 2a and 3a show red channel intensity while the images of FIGS. 2b and 3b show infrared channel intensity. The images of FIGS. 2a and 2b show the result of filtering with an edge-enhancing filter to sharpen the boundaries between regions. The images of FIGS. 3a and 3b show binary images obtained by thresholding the images of FIGS. 2a and 2b. The white pixels in the images of FIGS. 3a and 3b indicate the presence of a sharp edge or high intensity in the original image at the corresponding pixel.

After edge-enhancement by filtering, the images are thresholded to create a binary image using a threshold for which N percent of the pixels are over the threshold. A value N=80 is preferred since it produced the best overall results. All pixels are thresholded to black or white independently, and there is no attempt to create continuous lines. The threshold level in this image was chosen to cause 80% of the image pixels to survive thresholding and appear as white pixels.

The prefiltering processing highlights both edges and low intensity regions in the images of FIGS. 1a and 1b. The edges between light and dark and regions in the images of FIGS. 3a and 3b generally correspond to edges in the original images of FIGS. 1a and 1b, but may be offset slightly due to the action of the filter. The dark regions in the images of FIGS. 3a and 3b tend to be irregular and broken. There are two important characteristics of the image pair in FIGS. 3a and 3b. Firstly, not all black regions are common to both images, and secondly, some of the ones in common have different fine structure. These observations indicate that correlations of the processed images will tend to have normalized correlation peaks below the ideal value of unity. These characteristics are not due to the specific edge-enhancement and filtering used, but are in fact due to the underlying differences in the original images of FIGS. 1a and 1b.

Optionally, the images of FIGS. 3a and 3b are blurred with a filter that thickens each pixel in the images by any means known in the art. One such way is to blur by t pixels in a square array that extends t pixels in all four directions from the central pixel. Blurring may not be needed at full precision, but is preferable at reduced precision.

After thresholding and blurring the images of FIGS. 3a and 3b, the resolution of the images are reduced by any means known in the art. One such way to reduce resolution by a factor of $2^{2i}$ is to partition the image into square blocks of pixels with $2^i$ pixels per side and to replace each square with the sum of the pixel values. This is equivalent to computing the low-low subband of the Haar wavelet of the image at level i.

The processed images are then registered. The resolution is then refined to obtain higher precision. Preferably, normalized correlation is used as the criterion for registration.

The filtering, thresholding, blurring, resolution reduction, and registration described briefly above, will now be described in detail with reference to the Figures. The purpose of these steps in the registration methods of the present invention is to overcome the obstacles to successful registration mentioned earlier while retaining computational efficiency.

The methods of the present invention use edge-enhanced images in order to capture information in edges, which is more reliable than pure intensity for multispectral images. However, it has been found experimentally that it is significantly better to threshold edge-enhanced images than to threshold edge-only images. Edge-enhancement creates strong regional boundaries, which tends to produce broader boundaries after thresholding than does edge-detection. Broad boundaries correlate better than do narrow boundaries.

Many edge detectors use first-order directional derivatives to find transitions between regions. These detectors require multiple filter passes, each in a different primary direction. The registration methods of the present invention reduces the computational costs by eliminating the directional dependence, preferably by using second-derivative, direction-independent filters derived from 2D Laplacian filters. The typical filter H has the form $$H = \begin{bmatrix} -1 & -1 & -1 \\ -1 & C & -1 \\ -1 & -1 & -1 \end{bmatrix} \quad (1)$$

where C is a variable parameter. Because the result of filtering can be negative, the registration methods of the present invention use the absolute value of the filtered value rather than the signed value. A value C=8 creates an edge-only filter, and sharp edges in the original appear as a pair of peaks in the filtered image. Values of C greater than 8 combine the edges with the image itself in different proportions, and thereby create an edge enhancement.

Consider again the wetland scene depicted in the images of FIGS. 1a and 1b. Notice how the natural features in the image of FIG. 1a differs from the natural features in the image of FIG. 1b. The infrared image of FIG. 1b reveals regions in the tideland that have almost uniform intensity in the infrared spectrum, but vary considerably in the visible spectrum. Manmade structures in the image of FIG. 1b tend to have similar boundaries in the two images. Both correlation and mutual information criteria tend to work well with the manmade structures but do poorly with the tidelands. Mutual information fails to register these images correctly, but normalized correlation of the unfiltered images succeeds, albeit with a low correlation value of 0.27. Both methods do poorly, in general, for this type of image, and in many cases, both methods fail.

The edge-enhanced versions in FIGS. 2a and 2b corresponding to the images of FIGS. 1a and 1b use the 9-point filter with a center value of 8.5. Note how much sharper the images are in FIGS. 2a and 2b, than they are in FIGS. 1a and 1b.

After filtering, the registration methods of the present invention thresholds the images of FIGS. 2a and 2b, preferably, to binary values. Because the images of FIGS. 2a and 2b contain some intensity information of the original images of FIGS. 1a and 1b, the edges around regions of low intensity are less likely to survive thresholding than are the edges around high intensity regions. The threshold value is set in such a way as to pick up those edges, as well as some portions of higher intensity regions. The registration methods of the present invention preferably select the threshold automatically by computing a histogram of intensities and setting a threshold for which N % are over the threshold for a predetermined value of N. It has been found experimentally that the most effective thresholds for the filters used were those for which 70 to 80% of the pixels were greater than the threshold. The images of FIGS. 3a and 3b use a threshold of 80%.

The determination of the threshold is very similar to the histogram computation required to compute mutual information. The number of operations required is linearly proportional to the size of the image. The threshold computation is done just once per image registration, whereas the mutual information methods require the computation to be done for each relative position of the two images examined by the method. It is this aspect of the mutual information methods that incurs a heavy computational cost, and forces practical registration methods to do as few pairwise comparisons as possible.

As an example of image characteristics that hinder registration, note the major regions of the images of FIGS. 3a and 3b that exhibit intensity reversal. Note also that the edges of the manmade structures are dark in both of the images of FIGS. 3a and 3b. The nonuniformity of intensity reversal across the image greatly reduces the correlation peak heights, and decreases the likelihood of a successful registration.

Thickening (sometimes referred to as blurring) has two effects on correlation. The first is to enlarge the smaller features of an image so that they survive the filter/downsample process. This tends to increase the height of the correlation peak. The second effect is to broaden the correlation peak, which reduces the precision of the registration. Hence, thickening is useful to ensure that one can locate the correct registration position in a low-resolution image. Thickening is preferably abandoned or diminished at higher resolution in order to increase the precision of the final registration.

Thickening is used to reduce the translation sensitivity of wavelet coefficients. The coefficients of a wavelet representation depend on the relative position of the image with respect to the underlying wavelet grid. A mathematical model and detailed experiments known in the art show that correlations of wavelet coefficients in the low/low subband are relatively insensitive to translations, even though the wavelet coefficients themselves may be sensitive. However, this holds only for features large enough to be visible in the low-resolution wavelet subband. Note that for a resolution reduction of $2^{2i}$, blocks of size $2^i$ by $2^i$ map into a single wavelet coefficient. Hence features of size on the order of $2^i$ by $2^i$ or smaller are too small to be captured well in the low/low subband coefficients, and they have little influence on the correlations of the wavelet coefficients. The idea behind thickening is to transform small features into larger ones that will be visible in the low/low wavelet subband. Enlarging these features tends to increase their participation in the correlation process.

The choice of the thickening factor of t depends on the resolution of the wavelet. For example, for a resolution reduction of 1/64, blocks are size 8 by 8. Choosing t=17 ensures that features as small as 1 pixel will be visible in the low-resolution subband of the thickened image. However, correlation peaks broaden as thickening increases, making it more difficult to find the precise position of the correlation peak. One obtains better results overall by choosing a smaller value of t, say 5 or 9, for a resolution of 1/64. This compromise misses the smallest features in the images, which lowers the potential height of the correlation peak, but has little impact on the correlation peak width. Thickening by t involves forming the sum of pixels of overlapping blocks of size 2t+1×2t+1. It can be done efficiently by a block-update calculation that scans the image from left to right and top to bottom. The update requires only four operations per pixel plus a small overhead that depends on block size, but does not depend on the size of the image.

FIGS. 4a, 4b, 5a, 5b, 6a, and 6b show thickening of 5, 9, and 17, respectively, of the images of FIGS. 3a and 3b. Note how thickening fills in the boundary lines. Lines that are broken dots in the images of FIGS. 3a and 3b tend to be blurred solid lines in the corresponding images of FIGS. 4a, 4b, 5a, 5b, 6a, and 6b. All of the images in FIGS. 4a, 4b, 5a, 5b, 6a, and 6b are shown at full resolution.

Figures 7A, 7B:
FIG. 7a illustrates the image of FIG. 3a after resolution reduction by 64.
FIG. 7b illustrates the image of FIG. 6a after resolution reduction by 64.
Figures 8A, 8B:
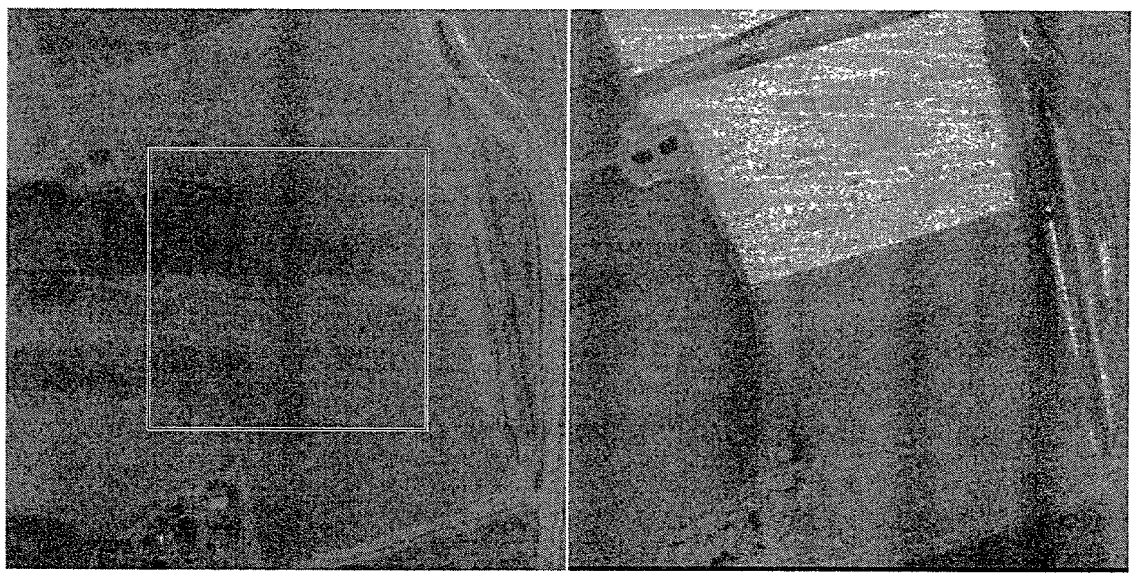
FIGS. 8a and 8b illustrate an agricultural image, with FIG. 8a illustrating the red channel intensity of the agricultural image and FIG. 8b illustrating the infrared channel intensity.
Figures 9A, 9B:
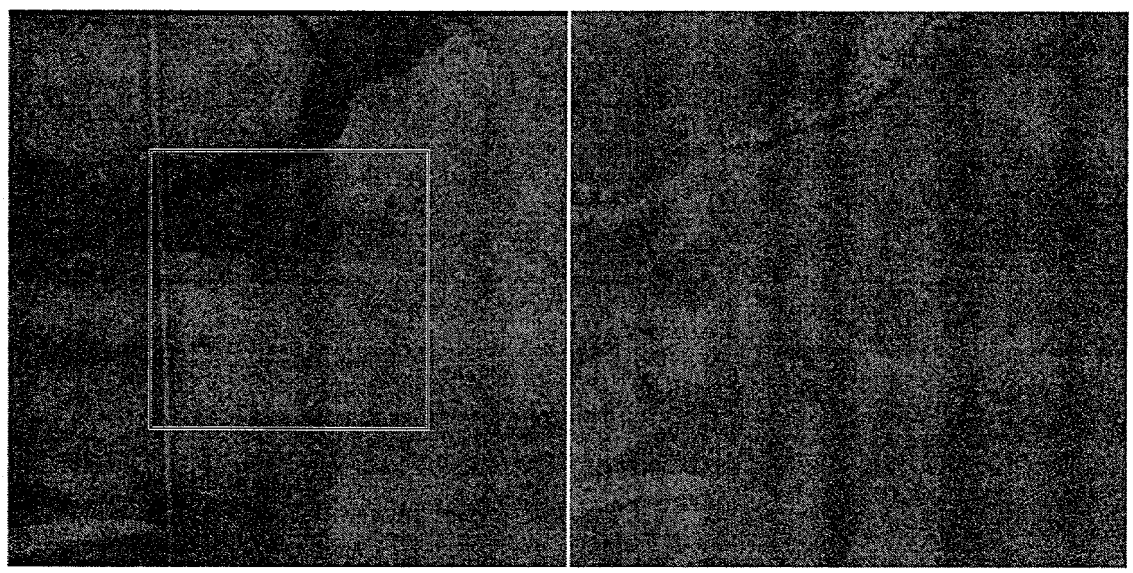
FIGS. 9a and 9b illustrate a forestry image, with FIG. 9a illustrating the red channel intensity of the forestry image and FIG. 9b illustrating the infrared channel intensity.
Figures 10A, 10B:
FIGS. 10a and 10b illustrate an urban image, with FIG. 10a illustrating the red channel intensity of the urban image and FIG. 10b illustrating the infrared channel intensity.

FIGS. 7a and 7b show the effect of resolution reduction after thickening of the image of FIG. 3a. The image of FIG. 7a is the 1/64th resolution reduction of the image of FIG. 3a, and the image of FIG. 7b is the same for the image of FIG. 6a (i.e., after thickening). Note that the vertical lines in the upper right of the image of FIG. 7a are broken and imperfect because of the translation dependence of the downsampling and filtering in computing the Haar wavelet. In the image of FIG. 7b, the same lines are more uniform because the image was blurred prior to computing wavelet coefficients.

The filtering, thresholding, thickening, and wavelet subband operations can be done very efficiently. The process requires 10 floating-point operations per pixel to evaluate H, two to compute the histogram for the threshold, one for threshholding, four for thickening, and one for the Haar wavelet subband. This is a total of less than 20 floating-point operations per full-resolution pixel. Normalizations of these operations are not required because the normalized correlation coefficient calculation does all the normalization that is necessary. These filtering operations are done only once per registration.

The computationally intensive part of a registration process is the evaluation of the registration criterion as a function of relative image position. If the cost is high, one must seek ways to keep the cost low. An effective way to do this involves a combination of resolution reduction and iteration. The registration methods of the present invention preferably use Fourier techniques in place of iteration to search large regions of the registration space very efficiently. This approach can be used effectively with resolution reduction to maintain low computational complexity. The key idea is that the normalized correlation coefficient as a function of relative translational position reduces to a function of vector correlations. A brief summary for one-dimensional functions is the following. Let $x=(x_0, x_1, \ldots, x_{N-1})$ by an N-vector image, and $y=(y_0, y_1, \ldots, y_{M-1})$ be an M-vector pattern drawn from a second image, with M<N. Let $C(x, y)_i$ be the normalized correlation coefficient of y aligned with x by shifting x relative to y by i positions, $0 \leq i \leq N-M$. The normalized correlation in summation form is given by:

$$C(x, y)_i = \frac{\sum_{k=0}^{M-1} x_{k+i} y_k - \frac{1}{M}\left(\sum_{k=0}^{M-1} x_{k+i}\right)\left(\sum_{k=0}^{M-1} y_k\right)}{\sqrt{\left(\sum_{k=0}^{M-1} x_{k+i}^2 - \frac{1}{M}\left(\sum_{k=0}^{M-1} x_{k+i}\right)^2\right)\left(\sum_{k=0}^{M-1} y_k^2 - \frac{1}{M}\left(\sum_{k=0}^{M-1} y_k\right)^2\right)}}. \quad (2)$$

Equation (2) can be evaluated for all translations i for a cost equal to a small factor times the cost to evaluate it for a single value of i. The trick is to rewrite the equation in terms of vector correlations u⊙v defined to be $$(u \odot v)_i = \sum_{k=0}^{k=M-1} u_{k+i} v_k \quad (3)$$

where u and v are N vectors, and index expressions i+j are modulo N.

Thus, four N-vectors are needed to convert Equation (2) into an equation that involves vector correlations in place of the summations that depend on i. Specifically, x is needed, and y is needed to extend to length N by appending N−M 0s. This vector is denoted as $\tilde{y}$. The vector whose elements are squares of the elements of x is also needed, which is denoted as $x^{(2)}$. Finally, a mask vector m is needed whose first M elements are 1, and whose last N−M elements are 0. The mask m indicates which elements of $\tilde{y}$ participate in the sums in Equation (2). In vector correlation form, Equation (2) becomes $$C(x, y)_i = \frac{(x \odot \tilde{y})_i - \frac{1}{M}(x \odot m)_i \left(\sum_{k=0}^{M-1} y_k\right)}{\sqrt{\left((x^{(2)} \odot m)_i - \frac{1}{M}(x \odot m)_i^2\right)\left(\sum_{k=0}^{M-1} y_k^2 - \frac{1}{M}\left(\sum_{k=0}^{M-1} y_k\right)^2\right)}} \quad (4)$$

Note that the summations of $y_k$ and $y_k^2$ in Equation (4) are independent of i and can be evaluated once per registration instead of once per relative position of the images. All N components of the vector correlations can be computed in the Fourier domain in a time proportional to N log N using fast Fourier transforms. Equation (4) requires four Fourier transforms of real vectors and three inverse Fourier transforms to real vectors. Noting that a pair of real transforms can be performed forward and inversely as a single complex transform, the total cost is equal to two forward Fourier transforms and two inverse Fourier transforms of complex data.

If N is not a power of 2, which is preferred for Fourier transforms, x can be extended to the next highest power of 2, with a corresponding mask vector for x. This results in a modified form of Equation (4) in which the summations of $y_k$ and $y_k^2$ become vector correlations involving the x mask, $\tilde{y}$ and $\tilde{y}^{(2)}$.

A Fourier-based registration search of all possible relative translations at any resolution can be done with about 500 to 700 flops (floating-point operations) per pixel at that resolution. This does not count the other operations per pixel or the fixed overhead in setting up the computation. Note that at 1/16th resolution, this is equivalent to about 33 to 45 flops per full resolution pixel, which is about twice the preprocessing cost. A mutual-information based registration method must do roughly 20 to 40 operations per pixel for each relative position of images. Hence, the Fourier-based algorithm can examine all relative translations at a given precision for a cost equal to that incurred by mutual-information algorithms to examine a few dozen relative translations at the same precision.

Iterative techniques usually require the estimate of a Hessian, gradient, and the mutual information function (or other criterion) to guide the direction of the search. Hence, the criterion function and its first and second derivatives must be well behaved over the search region in order to give correct estimates of the direction to move to improve registration. Because the Fourier-based method evaluates the registration criterion everywhere, it does not need to evaluate first and second derivatives, and is immune to problems caused by their potential ill behavior.

The Fourier-based search described herein provides an alternative to iterative searches, and it may be much faster for some combinations of parameters. Ultimately, its utility depends on the quality of its registrations. It is shown below that the Fourier-based correlation registration methods of the present invention produce results competitive with pixel-based mutual-information registration.

EXAMPLES

The experimental data reported below are the results of registrations of 340 image sets whose characteristics are now described. Each data set contains four unregistered images from different bands. The three bands from the visible spectrum are red, blue, and green, and the fourth is infrared.

These data sets were derived from 68 4-channel aerial image sets, each image of size 1536 by 1024. From each of these sets, five sets of size 512 by 512 were extracted. Four sets were taken from the corners of the image and one set from the center. The misregistration from channel to channel was +5 pixels in translation. Images differed as well by a very small rotation (a fraction of a degree) and by a small scale change. Within a 512 by 512 subimage, the rotation and scale change had little effect on the correlation. However, at the scale of the 1536 by 1024 image, the scale change and rotation were detectable and measurable. The translation offsets, scale change, and rotation values of the full image from the registrations of the five subimages were able to be computed.

The 68 fill images were drawn from four classes—agriculture (15 images), forestry (10 images), urban (33 images), and wetlands (10 images). Sample images of the first three appear in FIGS. 8a, 8b, 9a, 9b, 10a, and 10b, respectively, and the wetlands sample appears in FIGS. 1a and 1b. As a class, the urban images tend to be the easiest to register because of the presence of sharp edges and corners that are visible across the spectra. In increasing order of difficulty are forestry, agriculture, and wetlands. Registration errors in the agricultural images are largely due to misregistration of similar features. For example, straight lines without crossings are very difficult to register. The agricultural and wetlands images tended to be much more difficult because they contained fewer features in common across the spectra.

There is no ground truth available for these data sets. However, sets of images within a class have channel offsets that are approximately equal for all images in that class. A consistent ground truth for all images of a class for one type of image were able to be computed by using this information. Some subimages in the wetlands set are essentially featureless because they are totally filled by a mudflat or water, and are impossible to register.

The results for correlation-based registrations will now be presented without prefiltering, for pixel-based mutual information, and for correlation-based with prefiltering. In practice, the result of an image registration operation is a coordinate pair together with a number that represents the quality of that registration. For normalized correlation, the number is the height of the correlation peak. For mutual information, the number is the maximum of the mutual information function. If the quality measure is lower than a decision threshold, the registration is rejected. If the measure is equal or higher, the registration is considered valid, and the registration position is the position of the peak in the criterion function.

When doing a registration for the mutual information criterion, a region of size 11 by 11 centered at ground truth was searched. Mutual information is prohibitively expensive if you search a large region exhaustively, and was very expensive even for the relatively small region that was searched. A more efficient approach would be to do an iterative search for the function maximum, however, the code is more complex and could be sensitive to the shape of the mutual information function. Instead, a complete search of a small local region centered at the correct registration was chosen.

Normalized correlations were measured by using Fourier methods to build the global normalized correlation function as a function of relative position. Within this function, a local search was conducted over an 11 by 11 square region centered at the correct registration, the same region over which a local search was conducted for the mutual-information-based search. Since 500 to 700 floating-point operations are required to search all 121 positions in the search space, this works out to 4 to 6 floating-point operations per pixel per position examined. This accounts for the low amortized cost of the Fourier-based search.

The edge-enhancement step was tested on 5 different filters, four levels of thickening (1, 5, 9, 17), and 5 levels of threshold (50%, 60%, 70%, 80%. and 90% of pixels over the threshold) for each of three resolutions. The filters used were 9-point filters with $C=8$, 8.5, 9.5, 10.5, and a 5-point filter with $C=4$. 100 parameter sets were applied at three resolutions to 1020 image pairs—340 each of red-to-blue, red-to-green, and red-to-infrared registrations. This produced a total of 306,000 image registrations. In addition, pixel-based mutual-information registrations were performed at three resolutions, and correlation-based registrations of raw images at three resolutions. Space restrictions limit this summary to the important highlights.

Figure 11:
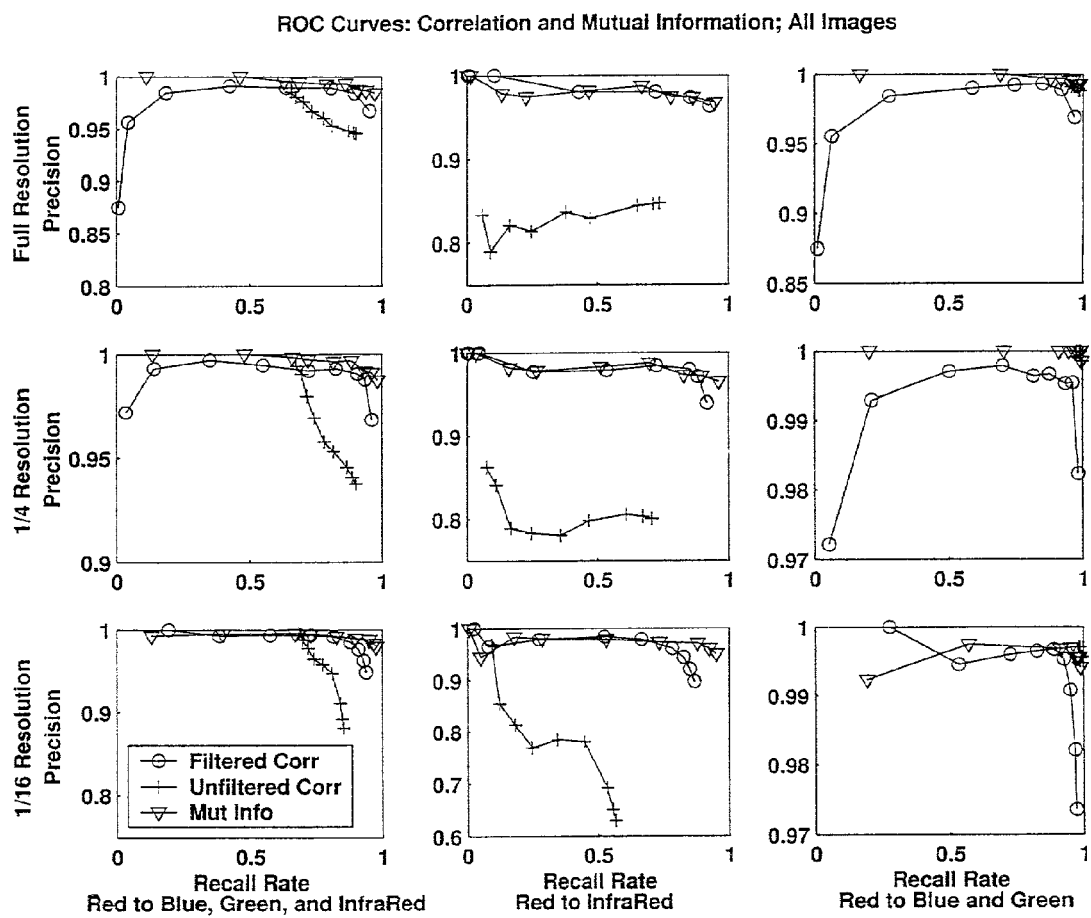
FIG. 11 illustrates a graphical summary of Receiver-Operating Characteristics (ROC) data.

Two measures—Recall and Precision—were used to evaluate the registrations. Each test produces a registration if the quality measure is over the decision threshold, and otherwise produces no registration. A registration was deemed correct if it matched ground truth ±2 pixels. Hence there are three possible outcomes—no match, correct registration, and false registration. The first measure, Recall, is the percentage of correct registrations out of the total number of images in the class. The second measure, Precision, is the percentage of correct registrations out of the sum of correct and incorrect registrations. FIG. 11 contains plots known as receiver-operating characteristic (ROC) curves, which show the relation between Precision and Recall. Each point is a Recall/Precision pair for a particular setting of the registration-decision threshold.

The ROC curves in FIG. 11 compare the relative performance of registration using correlation of filtered and unfiltered images with mutual-information-based registration. The first column on the left shows the ROC curves for all images and all cross-spectral cases. Resolution goes from full resolution at the top row of FIG. 11, $1;4$ resolution at the middle row, and to 1/16th resolution at the bottom row. These curves illustrate that correlation of unfiltered images gives substantially poorer behavior over all the cases than do either normalized correlation of filtered images or maximization of mutual information. The filter chosen for this study is described in more detail below. FIG. 11 reveals that filtering is effective in bringing normalized correlation to the point where it produces registrations comparable in quality to mutual information registrations. However, within the data set are subsets of images that are relative easy to register and some that are relatively difficult to register. The curves for the full data depend on the mixtures of those subsets in the full data set, and successes tend to mask failures.

The second and third columns from the left of FIG. 11 break up the data set into two subsets so that the performance on those subsets can be viewed individually. The second column plots ROC curves for red-to-infrared registrations, and they are clearly poorer than the comparable curves for the full dataset in the first column. The third column plots the registrations of red-to-blue and red-to-green data, and they are clearly better than those in the first column. In fact, correlations of unfiltered images do very well on these images. This indicates that cross-spectral normalized correlation works well without filtering for band-to-band correlations in the visible spectrum.

FIG. 11 shows that the main difficulty for this data set lies in the red-to-infrared registrations in the second column. Correlations of unfiltered images give very poor results, but filtering brings the quality up to a range comparable to the quality of mutual information.

In general, it is expected that Precision will fall with increasing Recall, because as the decision threshold is lowered to accept more registrations, a higher false-registration rate is likely. The curve in the upper left corner of FIG. 11 has low Precision at low Recall, and Precision increases with increasing Recall, which is unusual. This occurs when, at a high registration-decision threshold, there are very few registrations accepted, most of which are incorrect. Hence both Precision and Recall are low. As the decision threshold decreases, more registrations are accepted, which boosts Recall, and if most of the registration decisions are correct, Precision also increases.

Figure 12A:
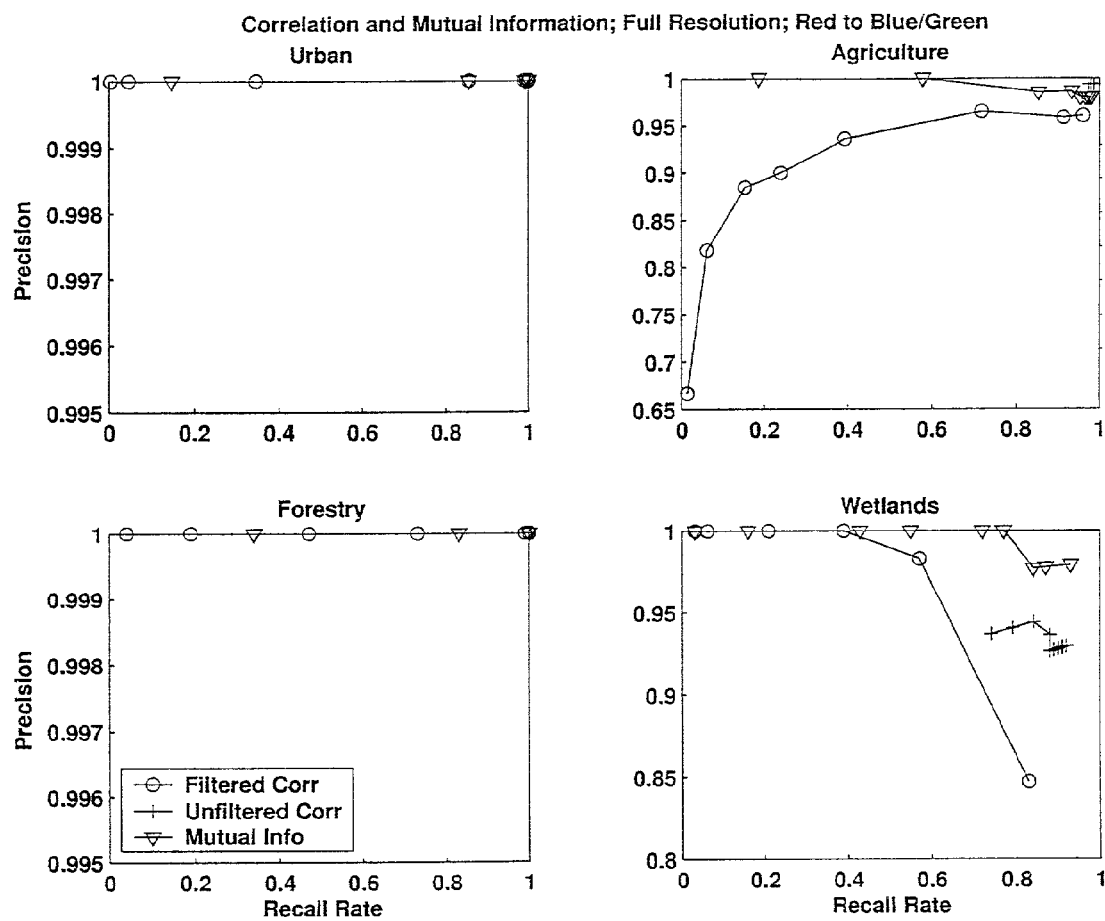
FIG. 12a illustrates ROC curves for registrations of images captured in the red spectrum and images captured in the blue and green spectra.
Figure 12B:
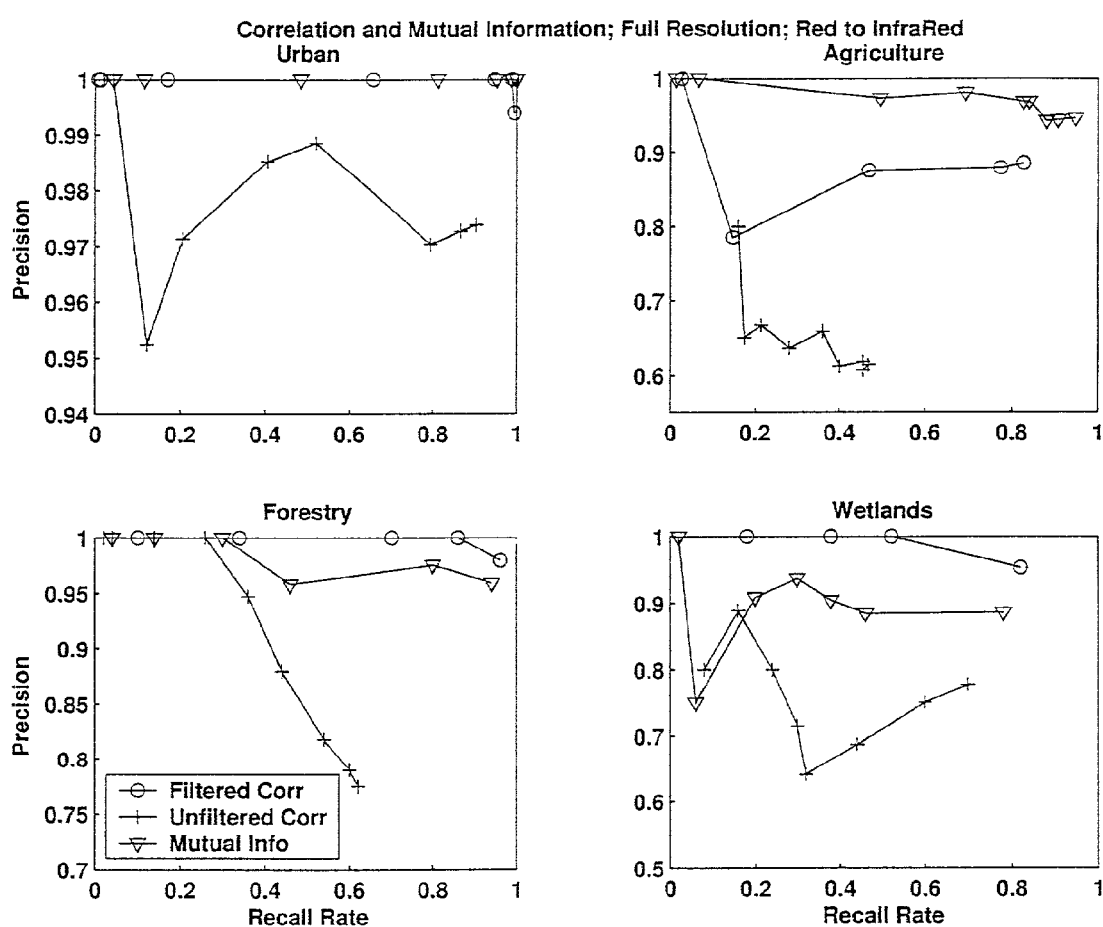
FIG. 12b illustrates ROC curves for registrations between images captured in the red spectrum and images captured in the infrared spectrum.

FIGS. 12a and 12b show another way to partition the data set to illustrate the behavior of the registration methods. This partition is by type of image. The four graphs in FIG. 12a are full resolution comparisons of urban, agriculture, forestry, and wetlands images for red to blue and green. All of the ROC curves for registration of red to blue and green are satisfactory for unfiltered correlation and mutual information registrations. Filtered correlation has some problems with the wetlands data, mainly because of featureless images. For cross-spectral registrations between visible spectra, FIG. 12a indicates that normalized correlation of unfiltered images is satisfactory.

FIG. 12b contains similar data for registration of red to infrared, and reveals some difficult cases. It shows that unfiltered correlation performs poorly on the nonurban classes, and is not a viable approach for those images. Note that both maximization of mutual information and normalized correlation of filtered images perform well on these classes, with mutual information doing better on the agricultural images, and correlation of filtered images doing better on forestry and wetlands images. Agricultural images seem to be a problem for correlation of filtered images because regular field patterns often have multiple correlation peaks. Infrared intensities apparently lead some false peaks to be emphasized over the correct peaks. Lack of space does not permit us to show that performance falls off as resolution diminishes, and is otherwise consistent with the full resolution data.

Figure 13:
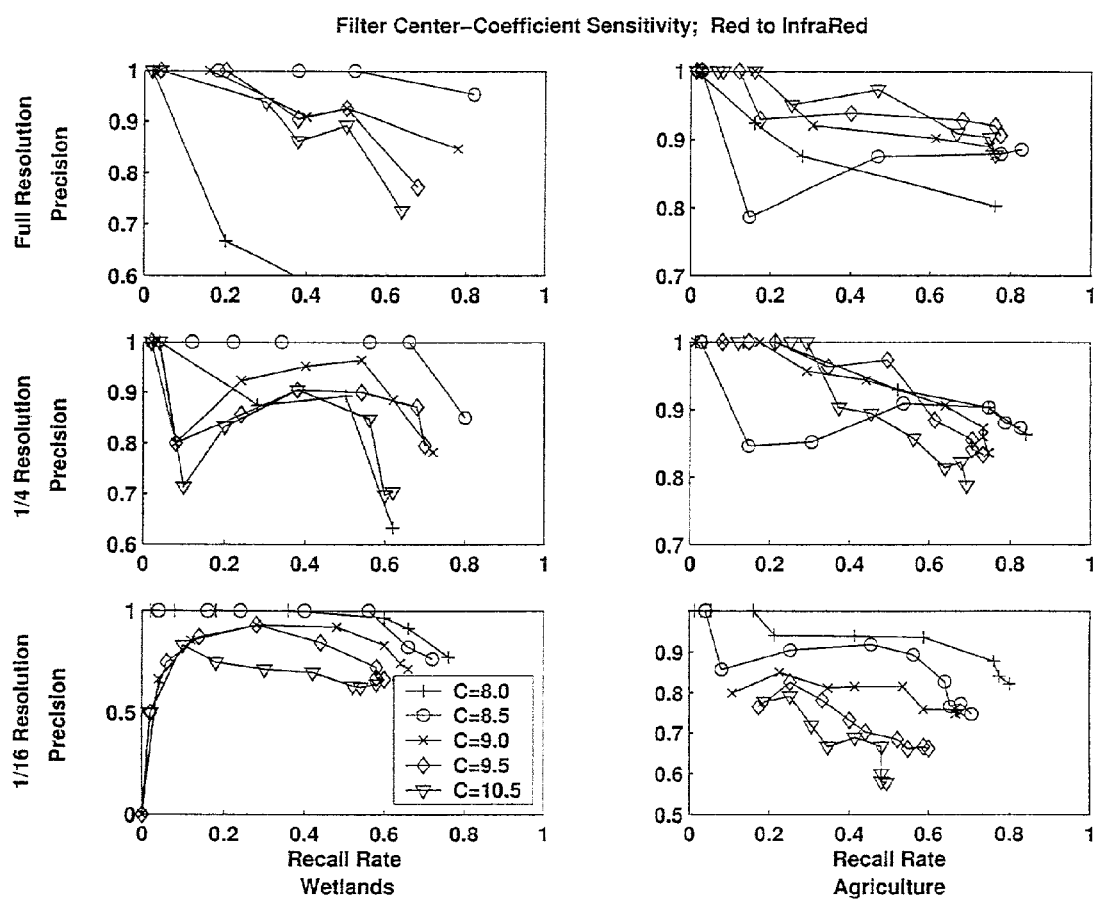
FIG. 13 illustrates sensitivity of ROC curves to center coefficient of a 9-point filter, where all filters except C=8.0 are thresholded at 80% and the filter for C=8.0 is thresholded at 50%.
Figure 14:
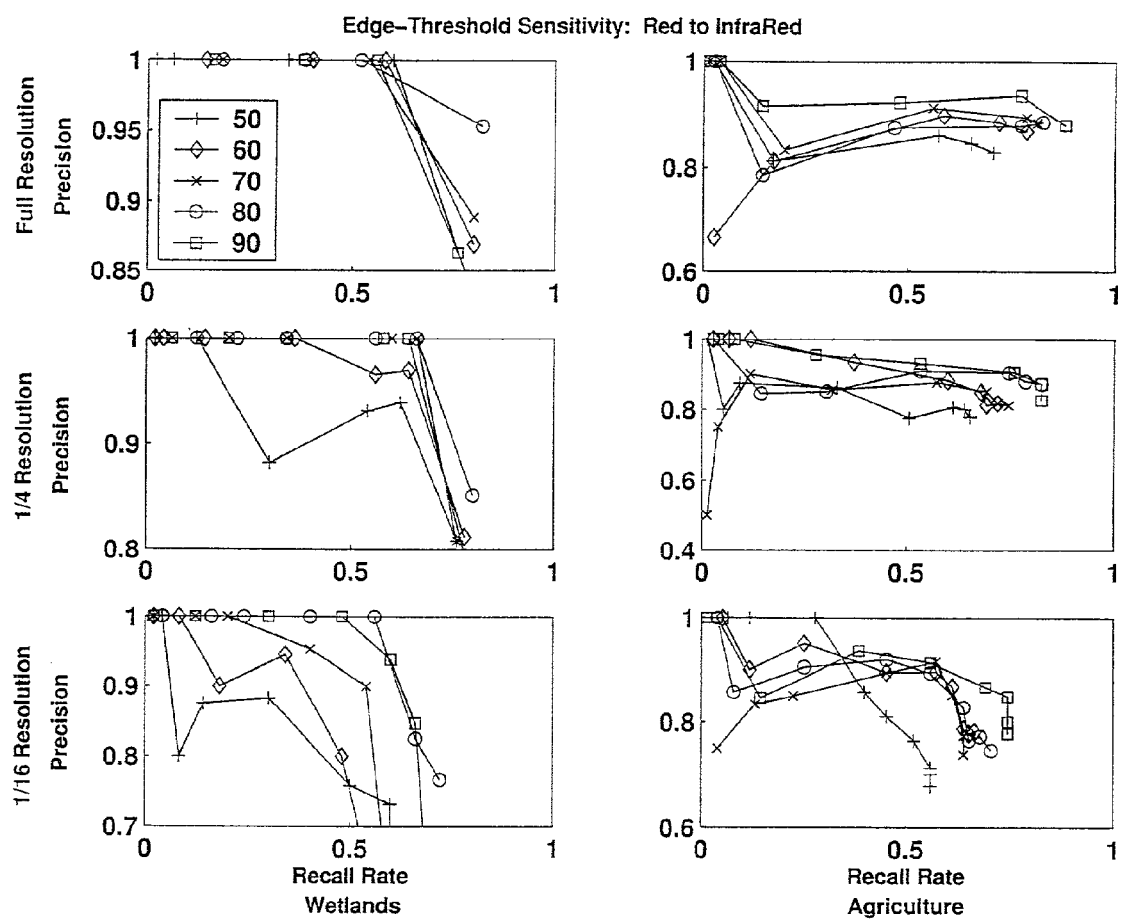
FIG. 14 illustrates the sensitivity of ROC curves to the edge threshold.
Figure 15:
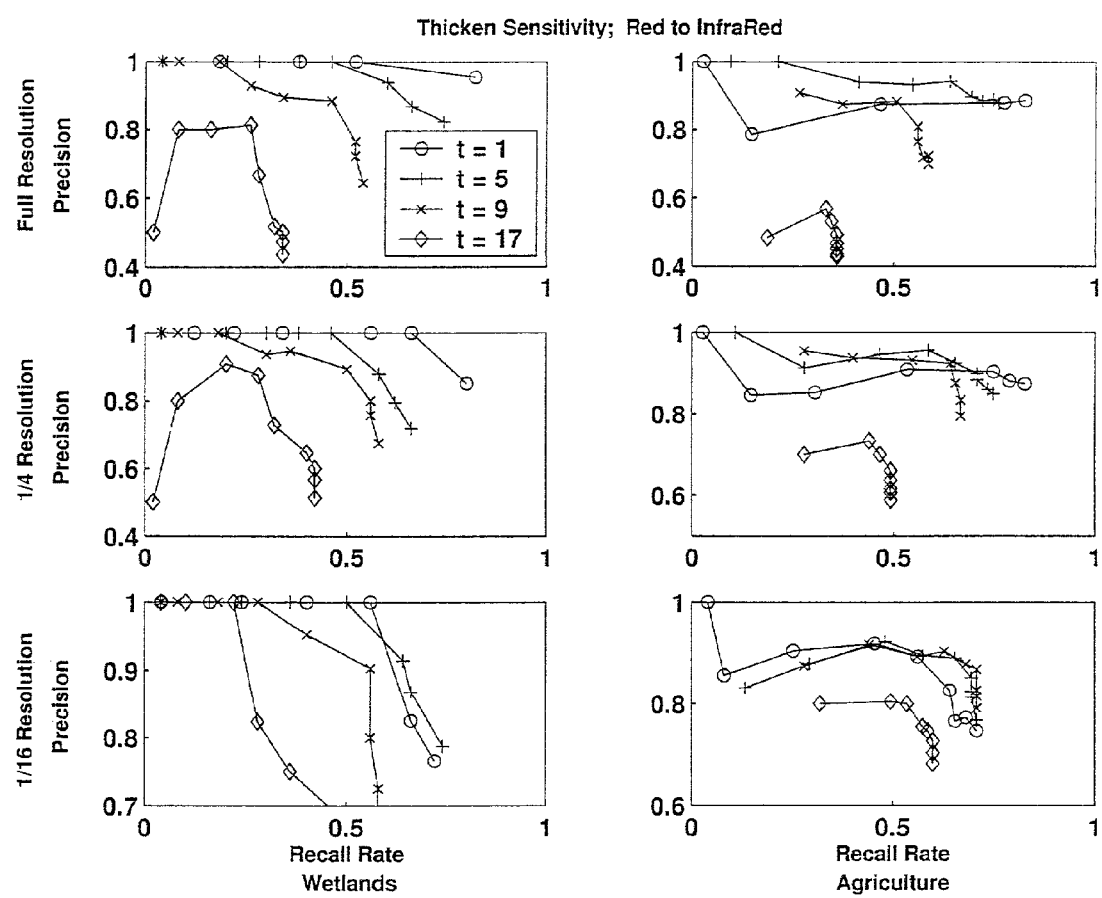
FIG. 15 illustrates the sensitivity of ROC curves to edge-thickening coefficient.

The main challenges for registering red to infrared are the agricultural and wetlands images. The search for suitable filters led to the choice of a filter with edge-enhancement parameter $C=8.5$, edge threshold set to 80%, and no thickening. FIGS. 13 through 15 show the effect of varying filter parameters around this test set. In general, the parameter settings are robust in the sense that small changes of the parameters have only a small effect on performance. Also, no filter gives the best performance on all image classes and all cross-spectral cases.

FIG. 13 shows how performance varies with the choice of filter constant C. The two columns show the ROC curves for agricultural and wetlands images, respectively, and the three rows show full, ¼, and ¹⁄₁₆th resolution. All registrations are of red to infrared. For these plots, the filter for C=8, a pure 8-point Laplacian, has an edge-detection threshold set to 50%, for which it has its best performance.

The effect of edge thresholding is illustrated in FIG. 14. This figure is similar to FIG. 13, except that the edge-detection threshold varies from 50% to 90% in each subplot. In all cases, the filter center value is C=8.5, and there is no edge thickening after edge detection. In this set of plots, the thresholds of 70% and 80% give similar performance.

FIG. 15 shows the effects of thickening on Recall and Precision. For wetlands data, thickening did not improve the registration process, although its registration performance was very close to being equal to the unthickened data. Thickening with t=5 was slightly better than the unthickened data for the agricultural images. The data does not show that thickening helps at low resolution, as was expected would be the case.

Note that the maximum recall rate for wetlands and agricultural data is on the order of 0.90 at full resolution, and drops as resolution falls. For the wetlands data, about 10% of the images are unregisterable by almost any blind method for lack of common features. FIG. 12 shows that, at full precision, mutual-information-based registration was able to register most of agricultural images that were not registerable by normalized correlation. However, it had a lower maximum recall rate for the wetlands images.

The combination of edge-enhancement, edge-detection, and Fourier-based normalized correlation is able to register images about as well as mutual-information-based methods, and is potentially faster. Fourier methods eliminate the need to use a nonlinear iteration to search for the relative translation that produces the best registration. The specific pre-processing steps investigated here appear to work well for cross-spectral registration of infrared to visible spectra, and may work across other spectra, provided that the images share a sufficient number of common features.

Those skilled in the art will appreciate that the experiments discussed above, performed on a moderate-sized database, show that the registration methods of the present invention produced a correct registration rate of over 90% at a false positive rate of less than 10%. For a particularly difficult subset of images in the database, the correct registration rate fell to approximately 85% at a false positive rate of less than 10%. This retrieval quality is comparable to that of the mutual-information-based registration methods of the prior art.

The methods of the present invention are particularly suited to be carried out by a computer software program, such computer software program preferably containing modules corresponding to the individual steps of the methods. Such software can of course be embodied in a computer-readable medium, such as an integrated chip or a peripheral device.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for blind registration of first and second images out of registration, the method comprising the steps of:
    (a) applying nonlinear pre-filtering and thresholding to the first and second images, thereby enhancing cross-spectral correlation between the first and second images, wherein applying the nonlinear pre-filtering further comprises applying an edge enhancement filter to make edges in the first and second images more prominent; and
    (b) registeting the first and second images by evaluating normalized correlation between the first and second images as a function of relative image position, where the normalized correlation is expressed as vector correlations computed in the Fourier domain.

2. The method of claim 1 wherein the normalized correlation is expressed as:

$$C(x, y)_i = \frac{(x \odot \tilde{y})_i - \frac{1}{M}(x \odot m)_i \frac{1}{2}\left(\sum_{k=0}^{M-1} yk\right)}{\sqrt{\left((x^{(2)} \odot m)_i - \frac{1}{M}(x \odot m)_i^2\right)\left(\sum_{k=0}^{M-1} y_k^2 - \frac{1}{M}\left(\sum_{k=0}^{M-1} yk\right)^2\right)}}$$

where x is the first image expressed as an N-vector image, y is an M-vector pattern drawn from the second image, ỹ is the y vector extended to length N, and m is a mask vector whose first M elements are 1 and whose last N−M elements are 0.

3. The method of claim 1 further comprising the step of reducing resolution of the first and second images prior to registering the first and second images.

4. The method of claim 3 wherein the resolution of the first and second images is reduced by partitioned the first and second images into blocks of pixels, each block of pixels replaced by a sum of pixel values in the block.

5. The method of claim 3 further comprising a step of blurring the first and second images prior to reducing resolution of the first and second images, where the images are blurred with a filter that thickens each pixel in an array that extends from a central pixel.

6. The method of claim 3 wherein the first and second images are registered at a low resolution and the resolution is subsequently refined to obtain higher precision.

7. The method of claim 1 wherein the edge enhancement filter is direction independent to reduce computational costs.

8. The method of claim 1 wherein applying thresholding to the first and second images further comprises computing a histogram of pixel intensities and setting a threshold for which a percentage are over the threshold.

9. The method of claim 8 wherein the threshold is 70 to 80 percent of pixels in the images.

10. A program storage device readable by machine, tangibly embodying a program of instructions executable by machine to perform method steps for blind registration of first and second images out of registration, the method comprising the steps of:

(a) applying nonlinear pre-filtering and thresholding to the first and second images, thereby enhancing cross-spectral correlation between the first and second images, wherein applying the nonlinear pre-filtering further comprises applying an edge enhancement filter to make edges in the first and second images more prominent; and (b) registering the first and second images by evaluating normalized correlation between the first and second images as a function of relative image position, where the normalized correlation is expressed as vector correlations computed in the Fourier domain.

11. The program storage device of claim 10 wherein the normalized correlation is expressed as:

$$C(x, y)_i = \frac{(x \odot \bar{y})_i - \frac{1}{M}(x \odot m)_i \frac{1}{2}\left(\sum_{k=0}^{M-1} yk\right)}{\sqrt{\left((x^{(2)} \odot m)_i - \frac{1}{M}(x \odot m)_i^2\right)\left(\sum_{k=0}^{M-1} y_k^2 - \frac{1}{M}\left(\sum_{k=0}^{M-1} yk\right)^2\right)}}$$

where x is the first image expressed as an N-vector image, y is an M-vector pattern drawn from the second image, ỹ is the y vector extended to length N, and m is a mask vector whose first M elements are 1 and whose last N−M elements are 0.

12. The program storage device of claim 10 further comprising the step of reducing resolution of the first and second images prior to registering the first and second images.

13. The program storage device of claim 12 wherein the resolution of the first and second images is reduced by partitioned the first and second images into blocks of pixels, each block of pixels replaced by a sum of pixel values in the block.

14. The program storage device of claim 12 further comprising a step of blurring the first and second images prior to reducing resolution of the first and second images, where the images are blurred with a filter that thickens each pixel in an array that extends from a central pixel.

15. The program storage device of claim 12 wherein the first and second images are registered at a low resolution and the resolution is subsequently refined to obtain higher precision.

16. The program storage device of claim 10 wherein the edge enhancement filter is direction independent to reduce computational costs.

17. The program storage device of claim 10 wherein applying thresholding to the first and second images further comprises computing a histogram of pixel intensities and setting a threshold for which a percentage are over the threshold.

18. The program storage device of claim 17 wherein the threshold is 70 to 80 percent of pixels in the images.

19. A computer program product embodied in a computer-readable medium for implementing blind registration of first and second images out of registration, the computer program product comprising:

(a) computer readable code means for applying nonlinear pre-filtering and thresholding to the first and second images, thereby enhancing cross-spectral correlation between the first and second images, wherein applying the nonlinear pre-filtering further comprises applying an edge enhancement filter to make edges in the first and second images more prominent; and (b) computer readable code means for registering the first and second images by evaluating normalized correlation between the first and second images as a function of relative image position, where the normalized correlation is expressed as vector correlations computed in the Fourier domain.

20. The computer program product of claim 19 wherein the normalized correlation is expressed as:

$$C(x, y)_i = \frac{(x \odot \bar{y})_i - \frac{1}{M}(x \odot m)_i \frac{1}{2}\left(\sum_{k=0}^{M-1} yk\right)}{\sqrt{\left((x^{(2)} \odot m)_i - \frac{1}{M}(x \odot m)_i^2\right)\left(\sum_{k=0}^{M-1} y_k^2 - \frac{1}{M}\left(\sum_{k=0}^{M-1} yk\right)^2\right)}}$$

where x is the first image expressed as an N-vector image, y is an M-vector pattern drawn from the second image, ỹ is the y vector extended to length N, and m is a mask vector whose first M elements are 1 and whose last N−M elements are 0.

21. The computer program product of claim 19 further comprising computer readable code means for reducing resolution of the first and second images prior to registering the first and second images.

22. The computer program product of claim 21 wherein the resolution of the first and second images is reduced by partitioned the first and second images into blocks of pixels, each block of pixels replaced by a sum of pixel values in the block.

23. The computer program product of claim 21 further comprising computer readable code means for blurring the first and second images prior to reducing resolution of the first and second images, where the images are blurred with a filter that thickens each pixel in an array that extends from a central pixel.

24. The computer program product of claim 21 wherein the first and second images are registered at a low resolution and the resolution is subsequently refined to obtain higher precision.

25. The computer program product of claim 19 wherein applying thresholding to the first and second images further comprises computing a histogram of pixel intensities and setting a threshold for which a percentage are over the threshold and wherein the threshold is 70 to 80 percent of pixels in the images.

* * * * *